(12) United States Patent
Roessler

(10) Patent No.: US 7,571,391 B2
(45) Date of Patent: Aug. 4, 2009

(54) SELECTIVE RENDERING OF USER INTERFACE OF COMPUTER PROGRAM

(75) Inventor: Andreas Roessler, Sulzfeld (DE)

(73) Assignee: SAP AG, Walldorf (DE)

( * ) Notice: Subject to any disclaimer, the term of this patent is extended or adjusted under 35 U.S.C. 154(b) by 933 days.

(21) Appl. No.: 10/688,856

(22) Filed: Oct. 17, 2003

(65) Prior Publication Data
US 2005/0086608 A1 Apr. 21, 2005

(51) Int. Cl.
*G06F 3/048* (2006.01)
(52) U.S. Cl. .................................. 715/764; 715/774
(58) Field of Classification Search ................. 715/764, 715/774
See application file for complete search history.

(56) References Cited

U.S. PATENT DOCUMENTS

| | | | | |
|---|---|---|---|---|
| 5,860,071 | A * | 1/1999 | Ball et al. ................. | 707/100 |
| 5,907,681 | A * | 5/1999 | Bates et al. ............... | 709/228 |
| 5,918,014 | A * | 6/1999 | Robinson ................. | 709/219 |
| 5,931,904 | A * | 8/1999 | Banga et al. ............. | 709/217 |
| 5,956,709 | A * | 9/1999 | Xue .......................... | 707/3 |
| 6,272,493 | B1 * | 8/2001 | Pasquali .................. | 707/10 |
| 6,366,933 | B1 * | 4/2002 | Ball et al. ................ | 715/203 |
| 6,636,242 | B2 * | 10/2003 | Bowman-Amuah ... | 715/764 |
| 6,950,990 | B2 * | 9/2005 | Rajarajan et al. ....... | 715/736 |
| 6,973,625 | B1 * | 12/2005 | Lupo et al. .............. | 715/762 |
| 6,983,421 | B1 * | 1/2006 | Lahti et al. .............. | 715/763 |
| 6,993,572 | B2 * | 1/2006 | Ross et al. ............... | 709/218 |
| 7,028,262 | B2 * | 4/2006 | Estrada et al. .......... | 715/751 |
| 7,188,342 | B2 * | 3/2007 | DeMello et al. ........ | 717/173 |
| 7,434,203 | B2 * | 10/2008 | Stienhans et al. ....... | 717/120 |
| 7,472,171 | B2 * | 12/2008 | Miller et al. ............. | 709/219 |
| 2002/0049637 | A1 * | 4/2002 | Harman et al. .......... | 705/26 |
| 2003/0120599 | A1 * | 6/2003 | Agboatwalla et al. .. | 705/50 |
| 2003/0189593 | A1 * | 10/2003 | Yarvin ..................... | 345/762 |
| 2004/0122971 | A1 * | 6/2004 | Joshi et al. .............. | 709/236 |
| 2004/0258089 | A1 * | 12/2004 | Derechin et al. ........ | 370/465 |
| 2007/0180432 | A1 * | 8/2007 | Gassner et al. .......... | 717/136 |

OTHER PUBLICATIONS

W3C.org et al, "Document Object Model" Oct. 1998 http://www.w3c.org/tr/1998/REC-DOM-LEVEL-1-19981001/introduction.html.*
Flanaga, David, et al. "User Interfaces with HTML and JavaScript" Feb. 1999 p. 1-9 http://web.archieve.org/web/19990209173759/http://w3j.com/5/s3.flanagan.html.*
Retrieved from Webarchive, Date; Nov. 2006; http://tapestry.apache.org/tapestry5/guide/request.html http://web.archive.org/web/20061105130130/http://tapestry.apache.org/tapestry5/guide/request.html.*

* cited by examiner

*Primary Examiner*—William L Bashore
*Assistant Examiner*—David Phantana-angkool
(74) *Attorney, Agent, or Firm*—Finnegan, Henderson, Farabow, Garrett & Dunner L.L.P.

(57) ABSTRACT

Methods, system and apparatus, including computer program products, for rendering a user interface in a client program. The techniques include detecting multiple changes to a user interface of a computer program, the user interface having multiple user interface elements, each change being a change to one of the multiple user interface elements; generating a rendering request for each change, each rendering request specifying the user interface element that has changed and a type of modification to be performed on the user interface element; and filtering the requests to eliminate redundant requests. The user interface can be rendered based on the filtered requests.

17 Claims, 4 Drawing Sheets

300 ↘

| 1 | UI Element 1 | Complete | ← 310 |
| 2 | UI Element 2 | Text Attribute | ← 320 |
| 3 | UI Element 2 | Complete | |
| 4 | UI Element 1 | Complete | |
| 5 | UI Element 3 | Color Attribute | |

SELECTIVE RENDERING OF USER INTERFACE OF COMPUTER PROGRAM

BACKGROUND

The present invention relates to data processing by digital computer, and more particularly to the rendering of a user interface (UI) in a client program.

Client-server applications typically include an application component running on a server computer, and a client program running on a client computer. The client program renders a UI through which a user can interact with the application.

User interaction with the UI, as well as server updates to the UI, can require the UI visualization (or portions thereof) to be re-rendered. Such re-rendering can be time-consuming.

SUMMARY OF THE INVENTION

The present invention provides methods, system and apparatus, including computer program products, for rendering a user interface in a client program. In general, in one aspect, the techniques include detecting multiple changes to a user interface of a computer program, the user interface having multiple user interface elements, each change being a change to one of the multiple user interface elements; generating a rendering request for each change, each rendering request specifying the user interface element that has changed and a type of modification to be performed on the user interface element; and filtering the requests to eliminate redundant requests.

Advantageous implementions include one or more of the following features. Each rendering request is a request to modify a data structure representing the user interface. The data structure is a document object model representation of the user interface. The type of modification is a complete re-rendering of the user interface element. The type of modification is an update of one or more, but not all, of the attributes of the user interface element. The operations further comprise rendering the user interface based on the filtered requests.

In general, in another aspect, the system includes a Web page rendered in a Web browser, the Web page including one or more user interface elements; a document object model representation of the Web page, and a framework running in the browser. The framework includes one or more trees that store the visualization of the Web page, each user interface element being associated with a portion of the document object model representation and with a portion of the tree; and a filtering mechanism for filtering rendering requests, each rendering request specifying a user interface element that has changed and a type of modification to be performed on the portion of the document object model representation associated with the specified user interface element. In one implementation, the trees include a UI tree, a data tree, or both.

The invention can be implemented to realize one or more of the following advantages. Filtering duplicative rendering requests can reduce, and in some cases eliminate, redundant rendering, thereby increasing system performance and improving the user's experience (e.g., due to faster response time or reduced flickering of the user interface). Application developers do not need to write code to implement selective rendering functionality for each application; instead, such functionality can be automatically provided by a framework on the client computer. One implementation of the invention provides all of the foregoing advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
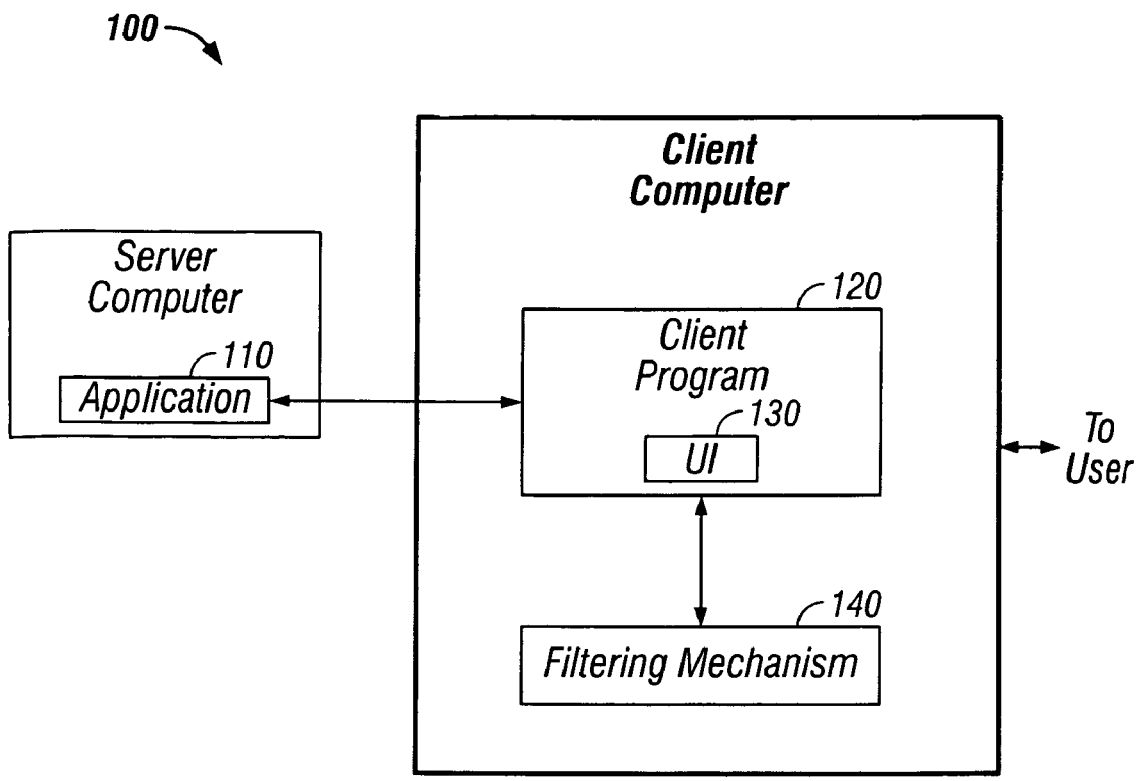
FIG. 1 is a block diagram of a system in accordance with the invention.

As shown in FIG. 1, a system 100 includes an application 110 running on a server computer and a client program 120 running on a client computer remote from the server computer. The client program 120 renders a user interface (UI) 130 that contains one or more UI elements through which a user interacts with, provides input to, controls, or receives output from the application. Examples of UI elements are views and controls (e.g., text fields, radio buttons, tables, trays, and menus).

Each UI element has a visualization that is defined by a view state, a data state, or both. The visual properties of the UI element define the view state of the UI element. Examples of visual properties include the visibility of a tray control (e.g., expanded or collapsed), or the scroll position of a table control. Data associated with the control defines the data state of the control. The data can include different types of data including strings, booleans, or objects (e.g., Java.util.date objects).

User or server actions may cause the visualization of the UI to change. User actions can include, for example, user entry of data into a text field, user selection of a radio button, or user manipulation of a scroll bar. Server actions can include, for example, a server response to a request from the client. When the visualization of the UI changes, portions (and in some cases all) of the rendered UI may need to be re-rendered to reflect the changes.

Figure 2:
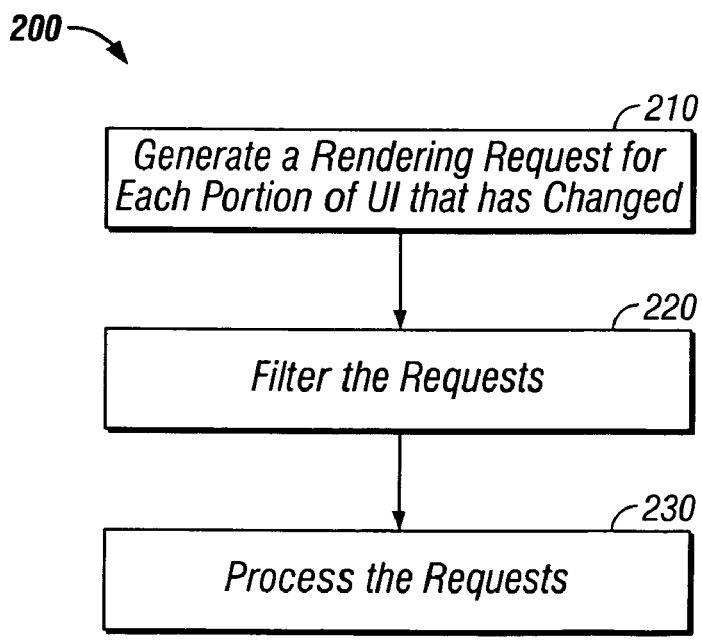
FIG. 2 is a flow diagram of a method in accordance with the invention.

Before the UI is re-rendered to reflect the changes, a filtering mechanism 140 filters the changes to eliminate redundancies. As shown in FIG. 2, for each portion of the UI that has changed, the filtering mechanism generates a rendering request (step 210). A given user or server action may cause multiple rendering requests to be generated.

Figures 3, 4:
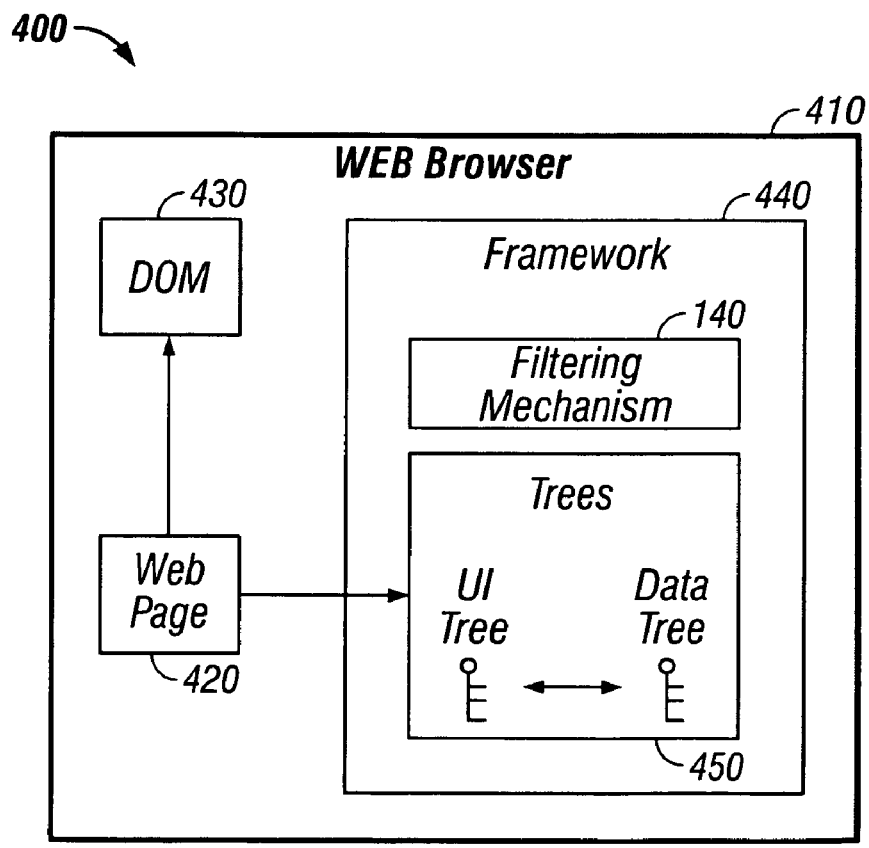
FIG. 3 shows an example of a list of rendering requests in accordance with the invention.
FIG. 4 is a block diagram of one implementation of the system.

FIG. 3 shows an example of a list 300 of rendering requests generated by the filtering mechanism 140. Each rendering request specifies a particular UI element and a type of modification to be performed on the specified UI element. One type 310 of modification involves a complete re-rendering of the specified UI element. A second type 320 of modification involves modifying one or more, but not all, of the attributes of the specified UI element.

Once all the rendering requests for a given user or server action have been generated, the filtering mechanism filters the requests to eliminate redundant requests (step 220). A redundant request is a request that is identical to or a subset of another request. In the example of FIG. 3, the first request and the fourth request are identical. Therefore, one of the requests can be eliminated. The second request, which specifies a change of one attribute of UI element 2, is encompassed by the third request, which specifies a complete re-rendering of the UI element 2. Therefore, the second request can be eliminated. The fifth request is not redundant with respect to any of the other requests.

The filtering mechanism then processes the remaining requests, for example, by delivering the requests to the client program 120 which then re-renders or modifies the UI based on the requests (step 230). In the example of FIG. 3, two of the five requests were eliminated by the filtering mechanism. For the remaining requests, the client program 120 renders all of UI element 1 according to either the first request or the fourth request, all of UI element 2 according to the second request, and modifies the color attribute of UI element 3 according to the fifth request.

In one implementation 400, as shown in FIG. 4, the client program 120 is a Web browser 410 and the UI 130 is a Web page 420. The Web browser communicates with the server using HTTP (Hypertext Transfer Protocol). HTTP is a stateless protocol, meaning that each time the Web browser requests a Web page, the server will respond to the request independently of any previous requests by the client device.

The server response generally includes code, for example, HTML (Hypertext Markup Language) code, that specifies how to render the Web page. For some Web pages, rendering the Web page involves generating a DOM (Document Object Model) 430 representation of the Web page. The DOM is a programming interface that provides access to and manipulation of the Web page. The DOM exposes a hierarchical view of the Web page. Each UI element in the Web page is represented by and bound to a node in the DOM hierarchy. When the DOM hierarchy is modified, the UI is re-rendered to reflect the modified DOM.

In the implementation of FIG. 4, the second type of modification is performed using a delta renderer. A delta renderer is a set of update functions that can modify the DOM representation of a UI element directly by using, for example, setter functions for various attributes of the UI element (e.g., setValue, setMaxLength, setColor, etc.). In one implementation, some, but not all, of the attributes of the UI element have setter functions.

If the request is from a new client, the server response also includes code for establishing a client-side framework 440 in the Web browser. The framework code can -include client-side scripting code such as, for example, JavaScript or VBScript code. The framework code can be embedded in the code for the Web page or stored as a separate file that is referenced by the code for the Web page. The framework code can be generated based on metadata for the application that is running on the server. Once the framework is established, it persists for multiple request-response cycles.

Figure 5:
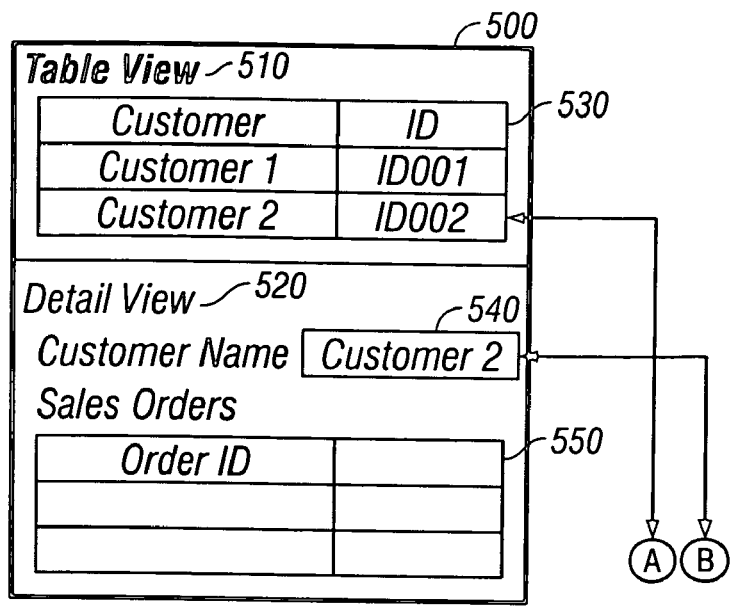
FIG. 5 shows an example Web page.
Figure 6:
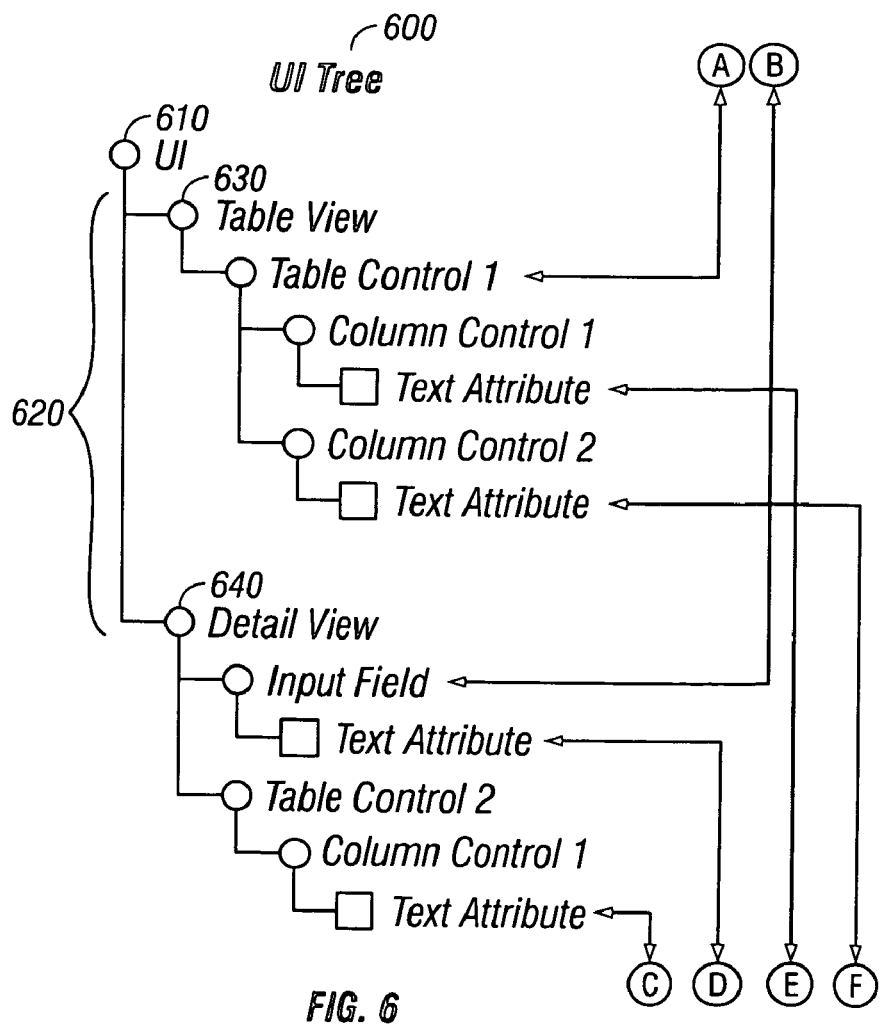
FIG. 6 shows an example UI tree.
Figure 7:
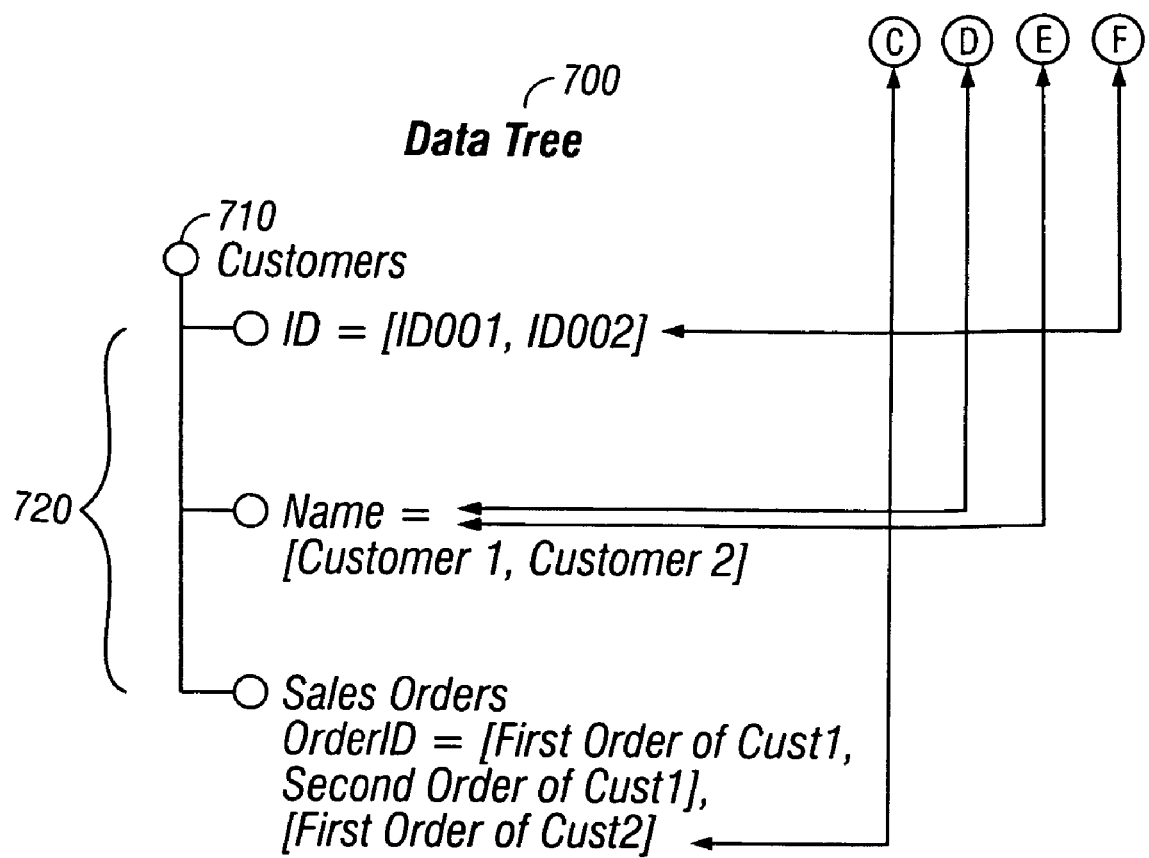
FIG. 7 shows an example data tree.

The framework includes one or more data structures 450 (e.g., UI trees and/or data trees) that store the current visualization of the Web page. For example, FIGS. 5-7 show a Web page 500 and a corresponding UI tree 600 and data tree 700 for the Web page 500.

The Web page 500 includes a first view (list view) 510 and a second view (detail view) 520. The list view includes a UI element table control 530 to list customers, and the detail view includes a first input field ID 540 and second input field SALES ORDERS 550 to list the ID and sales orders for a given customer.

The UI tree 600 has a root node 610 that represents the overall page and child nodes 620 that represent the UI elements contained in the Web page 500. The child nodes include nodes 630, 640 that correspond to the views (DETAIL, LIST). Each child node 630, 640 has further child nodes that correspond to the nested views and controls in the Web page 500.

The data tree 700 has a root node 710 that represents the customer data and child nodes 720 that store the ID, name, and sales orders for each customer. The arrows illustrate the bindings between the data tree 700, the UI tree 600 and the Web page 500.

In the implementation of FIG. 4, a user or server action may trigger an update of the UI or data tree. The update may result in changes to multiple portions of the UI or data tree. A change to a portion of the UI tree or data tree is detected by each UI element that is bound to the changed portion of the tree. Upon detecting such a change, each UI element determines whether all, or just a portion of its corresponding DOM representation needs to be updated. Each UI element also determines what kind of update has to be performed. For example, in one implementation, each UI element determines whether its entire DOM representation needs to be rebuilt, or whether only a portion of its DOM representation needs to be updated. Each UI element then generates a rendering request that specifies the UI element and an indication of whether to use a complete renderer or a delta renderer for the rendering. The system 100 places the rendering request in a list, which will be processed after the update is complete.

Once the update is complete, the system 100 iterates through the list and delivers each request to the UI element specified in the request. Once all the requests have been delivered, each UI element filters its own set of requests as described above with reference to the filtering mechanism 140, which in this implementation 400, is performed by the UI elements themselves.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, although the invention has been described with reference to visual rendering, the techniques can be used to render or generate other types of output, for example, auditory output. Furthermore, the steps of the invention can be performed in a different order and still achieve desirable results.

What is claimed is:

1. A computer program product, tangibly embodied in a computer-readable storage medium, the computer program product comprising instructions operable to cause a client apparatus to perform operations comprising:
    displaying, by the client apparatus, a user interface to a server computer program running on a server, the user interface including a plurality of user interface elements including a first user interface element, the first user interface element having a plurality of attributes;
    receiving, from the server, a server-generated chance to the first user interface element;
    receiving a client-generated change to the first user interface element based on a user input to the client apparatus;
    receiving a plurality of additional changes to the first user interface element based on additional user inputs to the client apparatus or additional changes received from the server;
    generating a server-based rendering request for the server-generated change and a client-based rendering request for the client-generated change, the server-based rendering request and client-based rendering request each specifying the first user interface element and a type of modification to be performed on the first user interface element;
    generating additional rendering requests for the additional chances to the first user interface element;
    categorizing both the server-based rendering request and the client-based rendering request as redundant because both the server-based rendering request and the client-based rendering request identify subsets of the attributes of the first user interface element also identified by the additional rendering requests for the additional changes;
    filtering both the server-based rendering request and the client-based rendering request to eliminate the redundant server-based rendering request and the redundant client-based rendering request; and
    rendering the first user input element, the rendering being limited to additional rendering requests and excluding the filtered server-based rendering request and the filtered client-based rendering request.

2. The product of claim 1, wherein each rendering request is a request to modify a data structure representing the user interface.

3. The product of claim 2, wherein the data structure is a document object model representation of the user interface.

4. The product of claim 1, wherein:
    at least one of the additional rendering requests is a request for a complete re-rendering of the user interface element.

5. The computer program product according to claim 1, wherein:
    the first user element is a text field, radio button, table, tray, or menu.

6. The computer program product according to claim 1, wherein at least one of the additional rendering requests, the server-based rendering request, or the client-based rendering request specifies a color attribute of the first user interface element.

7. The computer program product according to claim 1, wherein the first user interface element elements filters its own rendering requests.

8. A client apparatus comprising:
    means for displaying a user interface to a server computer program running on a server, the user interface including a plurality of user interface elements including a first user interface element, the first user interface element having a plurality of attributes;
    means for receiving, from the server, a server-generated change to the first user interface element;
    means for receiving a client-generated change to the first user interface element based on a user input to the client apparatus;
    means for receiving a plurality of additional changes to the first user interface element based on additional user inputs to the client apparatus or additional changes received from the server;
    means for generating a server-based rendering request for the server-generated change and a client-based rendering request for the client-generated change, the server-based rendering request and client-based rendering request each specifying the first user interface element and a type of modification to be performed on the first user interface element;

means for generating additional rendering requests for the additional changes to the first user interface element;

means for categorizing both the server-based rendering request and the client-based rendering request as redundant because both the server-based rendering request and the client-based rendering request identify subsets of the attributes of the first user interface element also identified by the additional rendering requests for the additional changes;

means for filtering, both the server-based rendering request and the client-based rendering request to eliminate the redundant server-based rendering request and the redundant client-based rendering request;

means for rendering the first user input element, the rendering being limited to additional rendering requests and excluding the filtered server-based rendering request and the filtered client-based rendering request; and a processor for implementing at least the means for filtering.

9. The client apparatus of claim 8, wherein each rendering request is a request to modify a data structure representing the user interface.

10. The client apparatus of claim 9, wherein the data structure is a document object model representation of the user interface.

11. The client apparatus of claim 8, wherein:

at least one of the additional rendering requests is a request for a complete re-rendering of the user interface element.

12. The client apparatus according to claim 8, wherein the first user interface element filters its own rendering requests.

13. A computer-implemented method comprising:

displaying, by a client apparatus, a user interface to a server computer program running on a server, the user interface including a plurality of user interface elements including a first user interface element, the first user interface element having a plurality of attributes;

receiving, from the server, a server-generated change to the first user interface element;

receiving a client-generated change to the first user interface element based on a user input to the client apparatus;

receiving a plurality of additional changes to the first user interface element based on additional user inputs to the client apparatus or additional changes received from the server;

generating a server-based rendering request for the server-generated change and a client-based rendering request for the client-generated change, the server-based rendering request and client-based rendering request each specifying the first user interface element and a type of modification to be performed on the first user interface element;

generating additional rendering requests for the additional changes to the first user interface element;

categorizing both the server-based rendering request and the client-based rendering request as redundant because both the server-based rendering request and the client-based rendering request identify subsets of the attributes of the first user interface element also identified by the additional rendering requests for the additional changes;

filtering both the server-based rendering request and the client-based rendering request to eliminate the redundant server-based rendering request and the redundant client-based rendering request; and rendering the first user input element, the rendering being limited to additional rendering requests and excluding the filtered server-based rendering request and the filtered client-based rendering request.

14. The computer-implemented method according to claim 13, wherein each rendering request is a request to modify a data structure representing the user interface.

15. The computer-implemented method according to claim 13, wherein the data structure is a document object model representation of the user interface.

16. The computer-implemented method according to claim 13, wherein at least one of the additional rendering requests is a request for a complete re-rendering of the user interface element.

17. The computer-implemented method according to claim 13, wherein the first user interface element filters its own rendering requests.

* * * * *

UNITED STATES PATENT AND TRADEMARK OFFICE
CERTIFICATE OF CORRECTION

PATENT NO.        : 7,571,391 B2                                              Page 1 of 1
APPLICATION NO. : 10/688856
DATED             : August 4, 2009
INVENTOR(S)       : Andreas Roessler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1156 days.

Signed and Sealed this

Seventh Day of September, 2010

David J. Kappos
*Director of the United States Patent and Trademark Office*